US010046618B2

(12) United States Patent
Kirsch et al.

(10) Patent No.: US 10,046,618 B2
(45) Date of Patent: Aug. 14, 2018

(54) SYSTEM AND METHOD FOR VEHICLE CONTROL INTEGRATING ENVIRONMENTAL CONDITIONS

(71) Applicant: Honda Motor Co., Ltd., Tokyo (JP)

(72) Inventors: David M. Kirsch, Torrance, CA (US); Harinkumar Vashi, Los Angeles, CA (US); Bonnie Chen, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 745 days.

(21) Appl. No.: 14/514,460

(22) Filed: Oct. 15, 2014

(65) Prior Publication Data
US 2016/0107509 A1    Apr. 21, 2016

(51) Int. Cl.
*B60W 40/08* (2012.01)
*B60H 1/00* (2006.01)

(52) U.S. Cl.
CPC ..... *B60H 1/00742* (2013.01); *B60H 1/00771* (2013.01); *B60W 40/08* (2013.01); *B60W 2040/0872* (2013.01); *B60W 2540/22* (2013.01)

(58) Field of Classification Search
CPC .......... B60H 1/00742; B60H 1/00771
See application file for complete search history.

(56) References Cited

U.S. PATENT DOCUMENTS

| | | | |
|---|---|---|---|
| 6,599,243 B2 * | 7/2003 | Woltermann | A61B 5/165 340/425.5 |
| 6,870,478 B2 * | 3/2005 | Yasushi | A61B 5/18 340/439 |
| 8,000,894 B2 | 8/2011 | Taylor et al. | |
| 8,204,786 B2 | 6/2012 | LeBoeuf et al. | |
| 8,704,669 B2 * | 4/2014 | Strumolo | B60H 1/00771 340/438 |
| 9,618,359 B2 * | 4/2017 | Weast | G01C 21/3697 |
| 2001/0020902 A1 * | 9/2001 | Tamura | G01C 21/3697 340/905 |
| 2003/0043045 A1 * | 3/2003 | Yasushi | A61B 5/18 340/576 |
| 2003/0097047 A1 * | 5/2003 | Woltermann | A61B 5/165 600/300 |
| 2005/0065682 A1 * | 3/2005 | Kapadia | G07C 5/008 701/36 |

(Continued)

OTHER PUBLICATIONS

Hiner: "Ford to use wearables to improve health and safety in cars", http://www.zdnet.com/ford-to-use-wearables-to-improve-health-and-safety-in-cars-7000030997/, dated Jun. 27, 2014.

*Primary Examiner* — Genna M Mott
(74) *Attorney, Agent, or Firm* — Rankin, Hill & Clark LLP

(57) ABSTRACT

A method for vehicle control integrating environmental conditions including receiving a current physiological parameter from a wearable device associated with a vehicle occupant, and upon receiving the current physiological parameter, determining a current position of the vehicle from a position determination device, wherein the current the current physiological parameter correlates with the current position of the vehicle. The method including determining a physiological overload level including querying a geodatabase with the current physiological parameter and the current position of the vehicle and controlling one or more vehicle systems of the vehicle based on the physiological overload level.

17 Claims, 5 Drawing Sheets

(56) References Cited

U.S. PATENT DOCUMENTS

| | | | | |
|---|---|---|---|---|
| 2012/0112915 A1* | 5/2012 | Strumolo | ........... | B60H 1/00771 340/573.1 |
| 2013/0054090 A1* | 2/2013 | Shin | ....................... | B60K 28/06 701/36 |
| 2015/0127215 A1* | 5/2015 | Chatterjee | ............. | H04W 4/001 701/36 |
| 2015/0313475 A1* | 11/2015 | Benson | ................ | A61B 5/6893 297/217.3 |
| 2016/0039424 A1* | 2/2016 | Hong | .................... | B60W 40/08 701/2 |
| 2016/0091337 A1* | 3/2016 | Weast | ................ | A61B 5/02438 701/439 |
| 2016/0275798 A1* | 9/2016 | Maytal | ................... | G08B 21/06 |

\* cited by examiner

| WEARABLE DEVICE ID / USER ID | VEHICLE POSITION | PHYSIOLOGICAL PARAMETERS | VEHICLE PARAMETERS | ENVIRONMENTAL PARAMETERS | PHYSIOLOGICAL OVERLOAD LEVEL / TYPE |
|---|---|---|---|---|---|
| 202 | (41N, -81W) | HEART RATE VALUE, PERSPIRATION RATE | VEHICLE SPEED, INTERIOR TEMPERATURE | TRAFFIC STATUS, TEMPORAL INFORMATION | 3, COGNITIVE OVERLOAD |
| 202 | (38N, 122W) | HEART RATE VALUE, MUSCULAR STRAIN | VEHICLE LIGHTING, AUDIO STATUS, DISPLAY STATUS | WEATHER CONDITIONS | 5, VISUAL OVERLOAD |
| 202 | (25N, -81W) | BODY TEMPERATURE, HEART RATE VALUE | VEHICLE SPEED, INTERIOR TEMPERATURE | EXTERNAL TEMPERATURE | 8, PHYSICAL OVERLOAD |
| 204 | (41N, -81W) | HEART RATE VALUE, PERSPIRATION RATE | VEHICLE SPEED, INTERIOR TEMPERATURE | TRAFFIC STATUS, TEMPORAL INFORMATION | 8, COGNITIVE OVERLOAD |
| 206 | (41N, -81W) | HEART RATE VALUE, PERSPIRATION RATE | VEHICLE SPEED, INTERIOR TEMPERATURE | TRAFFIC STATUS, TEMPORAL INFORMATION | 5, COGNITIVE OVERLOAD |
| 206 | (25N, -81W) | BODY TEMPERATURE, HEART RATE VALUE | VEHICLE SPEED, INTERIOR TEMPERATURE, MUSCLE STRAIN | EXTERNAL TEMPERATURE | 10, PHYSICAL OVERLOAD |
| 208 | (41N, -81W) | HEART RATE VALUE, PERSPIRATION RATE | VEHICLE SPEED, INTERIOR TEMPERATURE | TRAFFIC STATUS, TEMPORAL INFORMATION | 3, COGNITIVE OVERLOAD |
| 503 | (41N, -81W) | HEART RATE VALUE, PERSPIRATION RATE | VEHICLE SPEED, INTERIOR TEMPERATURE | TRAFFIC STATUS, TEMPORAL INFORMATION | 3, PHYSICAL OVERLOAD |
| 902 | (25N, -81W) | BODY TEMPERATURE, HEART RATE VALUE | VEHICLE SPEED, INTERIOR TEMPERATURE | EXTERNAL TEMPERATURE | 5, PHYSICAL OVERLOAD |
| 712 | (41N, -81W) | HEART RATE VALUE, PERSPIRATION RATE | VEHICLE SPEED, INTERIOR TEMPERATURE | TRAFFIC STATUS, TEMPORAL INFORMATION | 3, COGNITIVE OVERLOAD |
| ... | ... | ... | ... | ... | ... |

SYSTEM AND METHOD FOR VEHICLE CONTROL INTEGRATING ENVIRONMENTAL CONDITIONS

BACKGROUND

Wearable computing devices and other portable computers can be integrated across a wide variety of domains and fields for data acquisition. Within a vehicle, data from wearable computing devices can be used, in part, to determine states and behaviors of a driver and vehicle occupants. However, the states and behaviors of the driver and vehicle occupants can depend on a variety of parameters, beyond the scope of parameters detected by wearable computing devices. A dynamic and contextual vehicle environment can provide a pleasant and safe driving experience by adapting vehicle systems in real time for particular driving situations.

BRIEF DESCRIPTION

According to one aspect, a method for vehicle control integrating environmental conditions includes receiving a current physiological parameter from a wearable device associated with a vehicle occupant, and upon receiving the current physiological parameter, determining a current position of the vehicle from a position determination device, wherein the current physiological parameter correlates with the current position of the vehicle. The method includes determining a physiological overload level including querying a geodatabase with the current physiological parameter and the current position of the vehicle, and controlling one or more vehicle systems of the vehicle based on the physiological overload level.

According to another aspect, a method for vehicle control integrating environmental conditions includes receiving a current physiological parameter from a wearable device associated with a vehicle occupant, and upon receipt of the current physiological parameter, determining a current position of a vehicle and a future position of the vehicle from a position determination device. The method includes querying a geodatabase with the current physiological parameter, the current position of the vehicle and the future position of the vehicle to determine a physiological overload level, and controlling one or more vehicle systems of the vehicle based on the physiological overload level thereby changing a state of the vehicle occupant.

According to a further aspect, a system for vehicle control integrating environmental conditions includes a wearable device associated with a vehicle occupant for sensing one or more parameters associated with the vehicle occupant and a vehicle computing processor communicatively coupled to the wearable device, one or more vehicle systems and a geodatabase. The system includes an integration module of the processor that receives a current physiological parameter from the wearable device and a current position of the vehicle from a position determination device, wherein the current physiological parameter correlates with the current physiological parameter. The system also includes a physiological overload module of the processor that queries the geodatabase with the current physiological parameter and the current position of the vehicle to determine a physiological overload level, and wherein the processor controls one or more vehicle systems of a vehicle based on the physiological overload level.

BRIEF DESCRIPTION OF THE DRAWINGS

FIG. 5 is an exemplary database and table structure of a geodatabase according to an exemplary embodiment.

DETAILED DESCRIPTION

Figure 1:
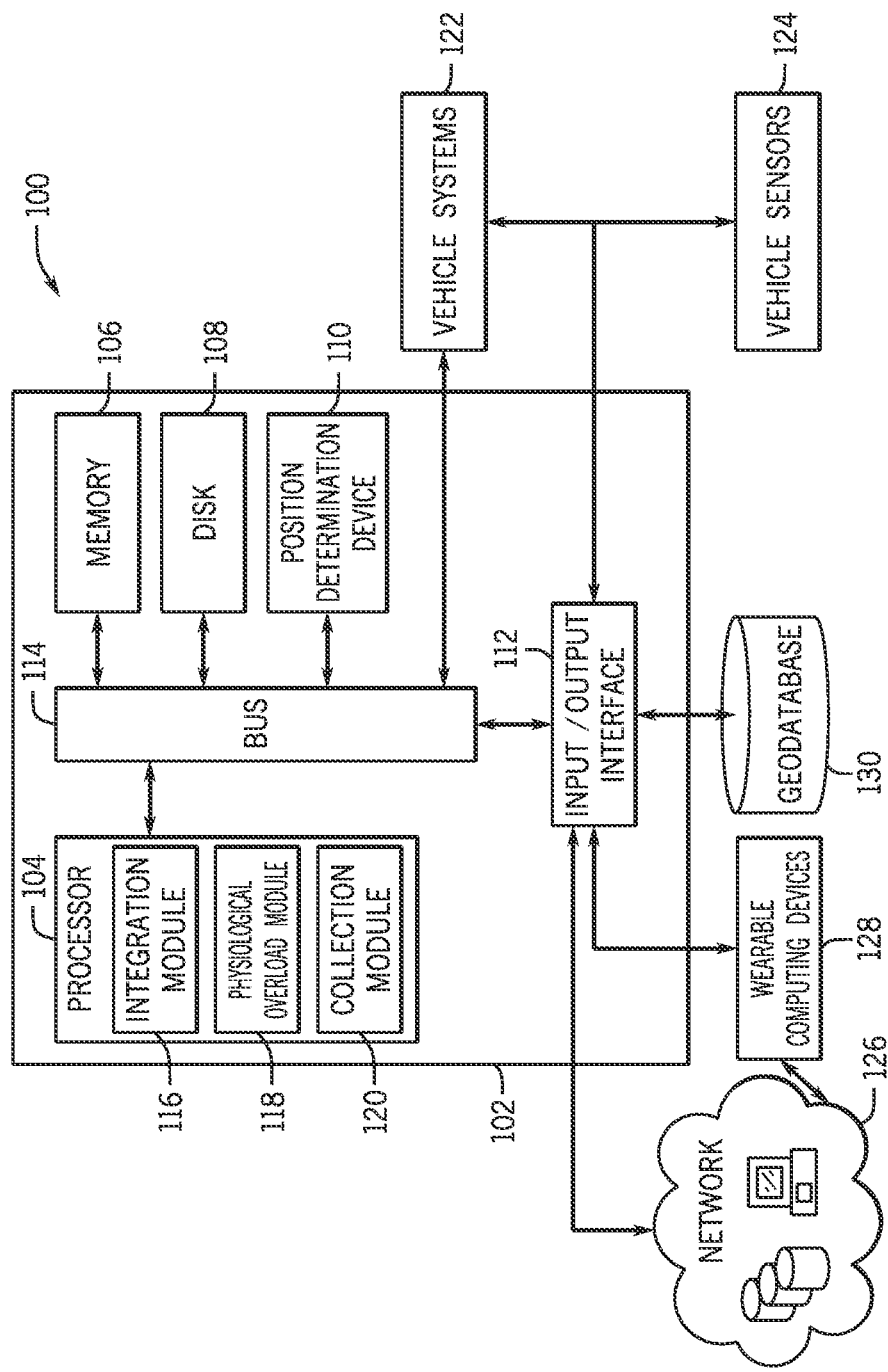
FIG. 1 is a schematic diagram of an operating environment for implementing systems and methods for vehicle control integrating environmental conditions according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

I. SYSTEM OVERVIEW

Generally, the systems and methods disclosed herein provide vehicle control integrating environmental conditions, location based services, and data from wearable computing devices associated with vehicle occupants. The methods and systems are described herein as including two operating modes: a collection mode and an active mode. However, the functions and components of the two modes can be reorganized into different architectures and/or implemented in other architectures, modes, and embodiments. It is understood that the collection mode and the active mode could run in parallel in some embodiments. Further, it is understood that other function, components or modes could be integrated. For example, as will be discussed herein in further detail, a decision mode.

Figure 2:
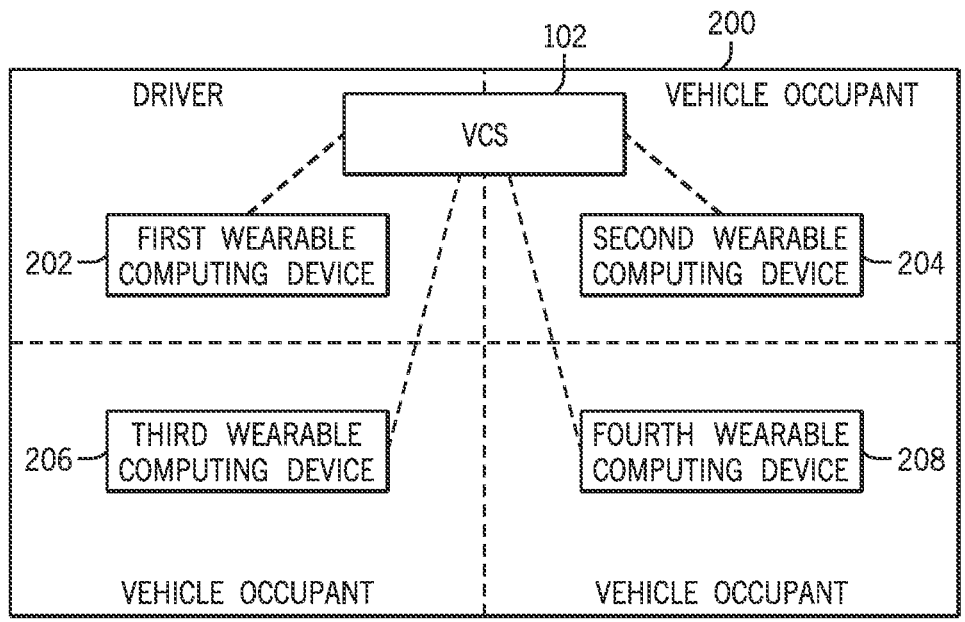
FIG. 2 is a schematic diagram of a vehicle implementing a system for vehicle control integrating environmental conditions according to an exemplary embodiment.

Referring now to the drawings, wherein the showings are for purposes of illustrating one or more exemplary embodiments and not for purposes of limiting same, FIG. 1 is a schematic view of an operating environment 100 for implementing systems and methods for vehicle control integrating environmental conditions according to an exemplary embodiment. The components of environment 100, as well as the components of other systems, hardware architectures, and software architectures discussed herein, can be combined, omitted, or organized into different architectures for various embodiments. Further, the components of the operating environment 100 can be implemented with or associated with a vehicle. For example, FIG. 2 illustrates a vehicle 200 implementing systems and methods for vehicle control integrating environmental conditions according to an exemplary embodiment.

In the illustrated embodiment of FIG. 1, the environment 100 includes a vehicle computing device 102 (VCD) with provisions for processing, communicating and interacting with various components of a vehicle and other components of the environment 100. In one embodiment, the VCD 102 can be implemented with the vehicle 200 (FIG. 2), for example, as part of a telematics unit, a head unit, a navigation unit, an infotainment unit, an electronic control unit, among others. In other embodiments, the VCD 102 can be implemented remotely from the vehicle 102, for example, with a portable device (not shown), an input/output device or at a device connected via a network, as will be described in further detail herein.

Generally, the VCD 102 includes a processor 104, a memory 106, a disk 108, a position determination device 110 and an input/output (I/O) interface 112, which are each operably connected for computer communication via a bus 114 and/or other wired and wireless technologies. The I/O interface 112 provides software and hardware to facilitate data input and output between the components of the VCD 102 and other components, networks, and data sources, which will be described herein. Additionally, as will be described in further detail with the systems and the methods discussed herein, the processor 104 includes an integration module 116, a physiological overload module 118 and a collection module 120, each suitable for providing vehicle control integrating environmental conditions facilitated by the components of the environment 100.

The VCD 102 is also operably connected for computer communication (e.g., via the bus 114 and/or the I/O interface 112) to one or more vehicle systems 122. Vehicle systems can include, but are not limited to, any automatic or manual systems that can be used to enhance the vehicle, driving, and/or safety. The vehicle systems 122 include and/or are operably connected for computer communication to various vehicle sensors 124, the vehicle sensors 124 providing, and/or sensing information associated with the vehicle, the vehicle environment, and/or the vehicle systems 122.

It is understood that the vehicle sensors can include, but are not limited to, the vehicle sensors 124 associated with the vehicle systems 122 and other vehicle sensors associated with the vehicle. Specific vehicle system sensors can include, but are not limited to, vehicle speed sensors, accelerator pedal sensors, brake sensors, throttle position sensors, wheel sensors, anti-lock brake sensors, camshaft sensors, among others. Other vehicle sensors can include, but are not limited to, cameras mounted to the interior or exterior of the vehicle, radar and laser sensors mounted to the exterior of the vehicle, external cameras, radar and laser sensors (e.g., on other vehicles in a vehicle-to-vehicle network, street cameras, surveillance cameras). The vehicle sensors 124 are operable to sense a measurement of data associated with the vehicle, the vehicle environment, the vehicle systems 122, and/or occupants of the vehicle, and generate a data signal indicating said measurement of data. These data signals can be converted into other data formats (e.g., numerical) and/or used by the vehicle systems 122 and/or the VCD 102 to generate other data metrics and parameters. It is understood that the sensors can be any type of sensor, for example, acoustic, electric, environmental, optical, imaging, light, pressure, force, thermal, temperature, proximity, among others.

In one embodiment, the VCD 102 can receive a vehicle parameter from the vehicle systems 122 and/or the vehicle sensors 124. Vehicle parameters can include information related to the vehicle 200 of FIG. 2 and/or the vehicle systems 122 of FIG. 1. Exemplary vehicle information includes, but is not limited to, steering information, lane departure information, blind spot monitoring information, braking information, collision warning information, navigation information, collision mitigation information, auto cruise control information, vehicle model, vehicle make, vehicle identification number. Vehicle information can be obtained by the VCD 102, the vehicle systems 122 and/or the vehicle sensors 124.

In a further embodiment, the VCD 102 can receive an environmental parameter. The environmental parameter could be received from the vehicle systems 122, the vehicle sensors 124, one or more wearable computing devices 128, and/or a remote source, for example, accessed by a network 126. Environmental parameters can include ambient environmental parameters as well as external environmental parameters. For example, environmental parameters can include, but are not limited to, vehicle cabin temperature, vehicle cabin lighting, display data, infotainment data, external weather conditions, road conditions, elevation, temporal information (e.g., time, day, week, month), and traffic information.

The VCD 102 is also operatively connected for computer communication to the network 126, the one or more wearable computing devices 128 and a geodatabase 130. It is understood that the connection from the I/O interface 112 to the network 126, the one or more wearable computing devices 128 and the geodatabase 130 can be facilitated in various ways. For example, through a network connection (e.g., wired or wireless), a cellular data network from a portable device (not shown) or a wearable computing device 128, a vehicle to vehicle ad-hoc network (not shown), an in-vehicle network (not shown), among others.

The network 126 is, for example, a data network, the Internet, a wide area network or a local area network. The network 126 serves as a communication medium to various remote devices (e.g., databases, web servers, remote servers, application servers, intermediary servers, client machines, other portable devices. It is understood that in some embodiments, the one or more wearable computing devices 128 can be included in the network 126, accessed by the VCD 102 through the network 126, and/or the network 126 can access the one or more wearable computing devices 128. Thus, in some embodiments, the VCD 102 can obtain data from the one or more wearable computing devices 128 via the network 126. The geodatabase 130 can be accessed and/or located in a similar manner.

As mentioned above, the operating environment 100 also includes a wearable device associated with a vehicle occupant for sensing one or more parameters associated with the vehicle occupant. For example, in FIG. 1 the one or more wearable devices 128 generally provide data to the VCD 102, the data being associated with the user wearing or associated with the wearable device 128. As discussed above, it is understood that the one or more wearable devices 128 can include, but are not limited to, a computing device component (e.g., a processor) with circuitry that can be worn or attached to user. In some embodiments, the one or more wearable devices 128 could also include a portable device (e.g., a mobile device). The one or more wearable devices 128 can include sensors for sensing and determining various parameters of a user, for example, location, motion, and physiological parameters, among others. In one embodiment, the sensors include bio-sensors for sensing physiological data and other data associated with the body and biological system of the vehicle occupant.

The parameters sensed and/or determined by the one or more wearable devices 128 can be acquired in real-time (e.g., current parameters) or stored (e.g., historical data) and aggregated at the wearable device 128 or a remote server. Accordingly, in some embodiments, the one or more wearable devices 128 can obtain other types of data associated with the user by accessing local or remotely stored data or data through a network connection (e.g., the Internet). Additionally, it is appreciated that some parameters can be sensed and/or determined by the one or more wearable devices 128 using gesture tracking and/or recognition implemented by the wearable devices 128.

The one or more wearable devices 128 are further illustrated in FIG. 2, which illustrates a schematic diagram of a vehicle implementing a system for vehicle control integrating environmental conditions according to an exemplary embodiment. The vehicle 200 can include the VCD 102 of FIG. 1. As shown in FIG. 2, the system and methods described herein can include one or more wearable computing devices that are each operably connected for computer communication to the VCD 102. For example, in FIG. 2, the VCD 102 is operably connected for computer communication to a first wearable computing device 202, associated with a driver; a second wearable computing device 204 associated with a first vehicle occupant; a third wearable computing device 206 associated with a second vehicle occupant; and a fourth wearable computing device 208 associated with a fourth vehicle occupant. It is understood that the systems and methods disclosed herein can include any number of vehicle occupants and wearable computing devices. Further, in some embodiments, the wearable computing device can include a device ID, which can be transmitted to the VCD 102 and used by the VCD 102 to identify the vehicle occupant associated with the wearable computing device.

Referring again to FIG. 1, in one embodiment, the VCD 102 can receive a physiological parameter from a wearable device. A physiological parameter can include, but is not limited to, heart information, such as, heart rate, heart rate pattern, blood pressure, oxygen content, etc., brain information, such as, electroencephalogram (EEG) measurements, functional near infrared spectroscopy (fNIRS), functional magnetic resonance imaging (fMRI), etc, digestion information, respiration rate information, salivation information, perspiration information, pupil dilation information, body temperature, muscle strain, as well as other kinds of information related to the autonomic nervous system or other biological systems of the vehicle occupant. In some embodiments, the physiological parameter can also include behavioral information, for example, mouth movements, facial movements, facial recognition, head movements, body movements, hand postures, hand placement, body posture, gesture recognition, among others. In other embodiments, it is understood that the one or more wearable computing devices can also sense and determine a position of the associated vehicle occupant, a position of the vehicle, a vehicle parameter and/or an environmental parameter.

The physiological, vehicle and environmental parameters discussed above, in one embodiment, can be received by the VCD 102 and used relative to the geodatabase 130. For example, as will be discussed in more detail herein, during a collection mode, one or more of these parameters can be collected and stored in the geodatabase 130. In an active mode, one or more of these parameters can be used to query the geodatabase 130. FIG. 5 is an exemplary database and table structure of a geodatabase according to an exemplary embodiment. As shown in FIG. 5, a table 500 includes the different parameters (e.g., vehicle position, physiological parameters, vehicle parameters, environmental parameters) and physiological overload triggers/levels associated with a wearable device ID and/or user ID. The geodatabase 130 can include data from the vehicle occupants in the vehicle 200 of FIG. 2, as well as other groups of individuals. Thus, the geodatabase 130 can include aggregate data or the data in the geodatabase 130 can be used to determine aggregate data, for example, for a group of individuals in a geographical location. This allows the methods and systems discussed herein to control vehicle systems using individual data and group data. It is understood that the table 500 of FIG. 5 is exemplary in nature and could be reorganized into multiple tables and/or relational databases in various schemas.

II. COLLECTION MODE

Figure 3:
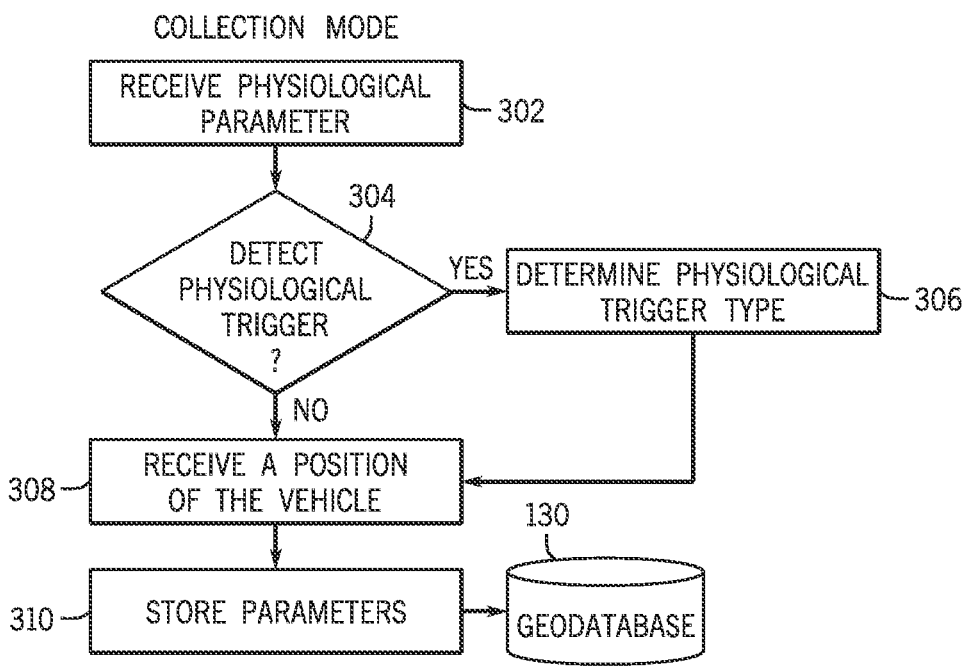
FIG. 3 is a process flow diagram of a method for vehicle control integrating environmental conditions during a collection mode according to an exemplary embodiment.

An exemplary collection mode will now be described according to an exemplary embodiment and with reference to FIGS. 1-3. FIG. 3 is a process flow diagram of a method for vehicle control integrating environmental conditions during a collection mode according to an exemplary embodiment and includes the geodatabase 130 of FIG. 1. In one embodiment, the geodatabase 130 is generated during the collection mode by the collection module 120. It is appreciated that the geodatabase 120 can be generated with other data and/or can include other data from other sources, for example, a remote database with data about a group of individuals.

At block 302, the method includes receiving a physiological parameter from a wearable device associated with a vehicle occupant. For example, the collection module 120 of the processor 104 can receive a physiological parameter from the one or more wearable computing devices 128. Referring to FIG. 2, the VCD 102, including the processor 104, can receive a physiological parameter from one or more wearable computing devices, each associated with a different vehicle occupant. As an illustrative example, the VCD 102 can receive a heart rate from the first wearable computing device 202 associated with the driver and a heart rate from the second wearable computing device 204 associated with a first vehicle occupant.

It is appreciated that the collection module 120 can receive the physiological parameter at predetermined time intervals. In some embodiments, the one or more wearable computing devices 128 are configured to transmit the physiological parameter at a predetermined time interval. In other embodiments, the collection module 120 can poll the one or more wearable computing devices 128 to transmit the physiological parameter at a predetermined time interval. An exemplary predetermined time interval can be 50 ms at a frequency of about 20 Hz. Further, in one embodiment, the VCD 102 and/or the collection module 120 can distinguish and/or associate the physiological parameter with the associated vehicle occupant by receiving a wearable device ID and/or a user ID associated with the wearable device. Thus, in some embodiments, the collection module 120 can receive the physiological parameter and a wearable device ID from the one or more wearable computing devices 128.

It is also appreciated that the collection mode discussed herein can apply to other individuals not present in the vehicle 200. For example, the geodatabase can include data from a group of individuals received from other devices and/or databases. In particular, data can be received from a group of individuals driving a specific model and make of a vehicle. Data can also be received from a group of individuals in a particular location. Thus, the physiological parameters can be received from any group of individuals, in other vehicles or present in other situations. Further, it is appreciated that more than one physiological parameter can be received and one or more other parameters can be received. For example, vehicle parameters and environmental parameters.

Returning to FIG. 3, at block 304, the method includes detecting a physiological overload trigger based on the physiological parameter. In one embodiment, a physiological overload trigger is detected by comparing the physiological parameter to a predetermined threshold. The predetermined threshold could be based on normative data for the particular vehicle occupant, average data associated with the physiological parameter, among others. As an illustrative example, if the physiological parameter received is a heart rate value of 110 bpm and the predetermined threshold is 100 bpm, a physiological overload trigger is detected.

If a physiological overload trigger is detected, at block 306, the method includes determining a physiological overload trigger type. The physiological overload trigger type is at least one of a cognitive overload trigger, a physical overload trigger, and a visual overload trigger. The physiological overload type is based, at least in part, on the physiological parameter. Thus, for example, a heart rate value of 110 bmp can be classified as a physical overload type since heart rate is associated with the physical being of the vehicle occupant and/or the biological systems of the vehicle occupant. As another example, a physiological overload based on a physiological parameter indicating eye movement can be classified as a visual overload type. Further, a physiological overload based on a physiological parameter indicating distraction can be classified as a cognitive overload type. It is appreciated that more than one physiological parameter can be used to detect a physiological overload trigger and determine a physiological overload trigger type. Further, in some embodiments, other parameters (e.g., vehicle, environmental) can be used to detect a physiological overload trigger and determine a physiological overload trigger type. It is also understood, that in some embodiments, the collection module 120 can detect a physiological overload trigger and/or determine a type of the physiological overload trigger.

In some embodiments, determining a physiological overload trigger type can include determining a physiological overload level. The physiological overload level generally indicates a state, health and/or a behavior of the vehicle occupant. The level can be a numerical value, a discrete state, a discrete value and/or a continuous value. The physiological overload level is based, at least in part, on physiological parameters. The physiological overload level can be determined by the physiological overload module 18 and/or the collection module 120. In some embodiments, the physiological overload level is determined based on a comparison to a predetermined physiological level, for example, based on normative data.

Referring again to FIG. 3, if the determination at block 304 is NO or the physiological trigger type has been determined at block 306, at block 308 the method includes receiving, for example by the collection module 120, a position of the vehicle from a position determination device (e.g., the position determination device 110 of FIG. 1). The position of the vehicle can be in different forms, for example, latitudinal and longitudinal coordinates. The position of the vehicle correlates to the physiological parameter and/or the physiological overload trigger. Said differently, the position of the vehicle correlates with the onset and duration of the physiological parameter and/or the physiological overload trigger.

As an illustrative example, the position of the vehicle is the position of the vehicle where the vehicle occupant experiences a high heart rate. In some embodiments, the physiological parameter and the position of the vehicle are received in parallel. In other embodiments, the position of the vehicle is received upon receipt of the physiological parameter. In other embodiments, the position of the vehicle is determined after receiving the physiological parameter by acquiring data stored at the position determination device 110. It is understood that in some embodiments, other parameters can be received at block 308 that correlate with the physiological parameter, the vehicle occupant, and/or the vehicle. For example, vehicle parameters, such as a vehicle make and/or model could be received by the collection module 120.

At block 310, the method includes storing the physiological parameter and the position of the vehicle in a geodatabase for future use. In particular, the geodatabase is used for future use during an active mode of the vehicle. In one embodiment, the collection module 120 transmits the physiological parameter and the position of the vehicle to the geodatabase 130 to be stored. In a further embodiment, at block 310 the method also includes storing other parameters, for example, the physiological overload trigger type, the physiological overload level, vehicle parameters, environmental parameters, among others. Accordingly, the collection mode illustrated in FIG. 3 collects and stores data in the geodatabase 130 for use during an active mode for vehicle control integrating environmental conditions.

II. ACTIVE MODE

Figure 4:
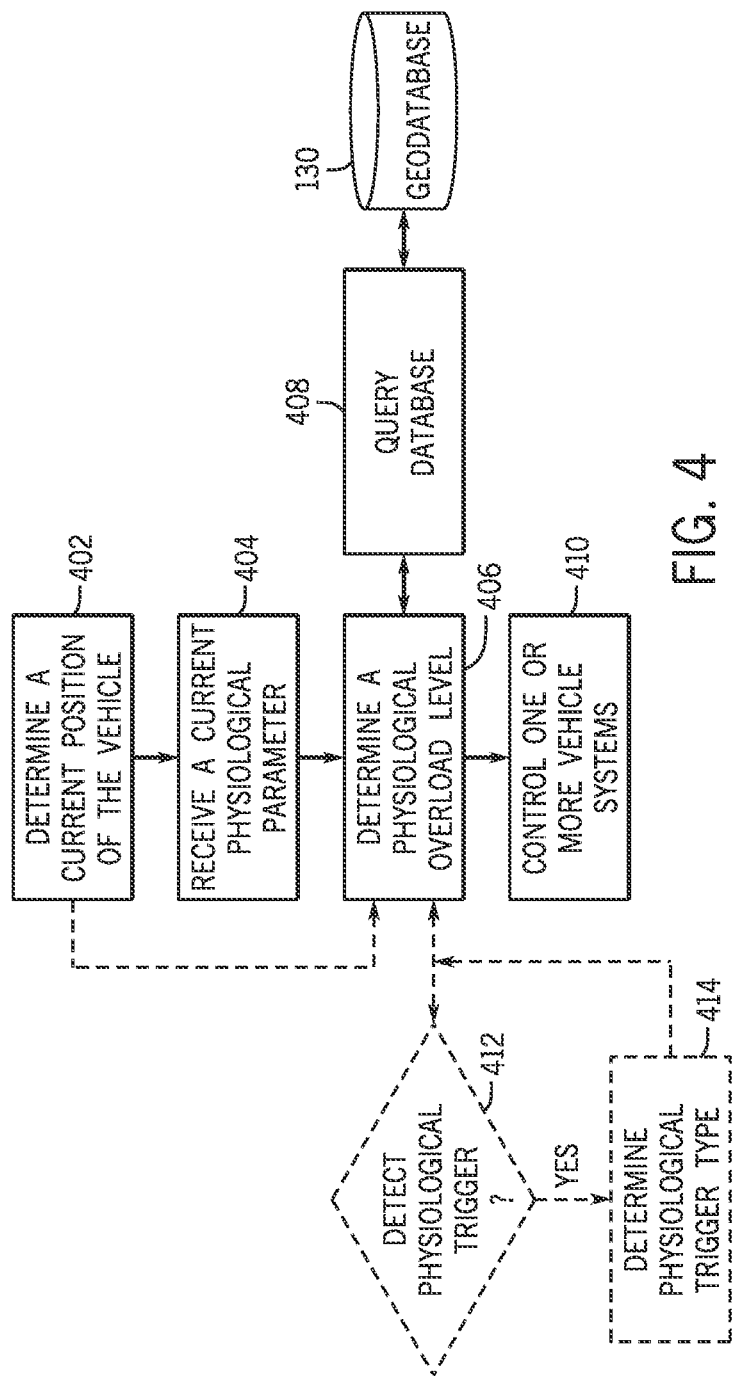
FIG. 4 is a process flow diagram of a method for vehicle control integrating environmental conditions during an active mode according to an exemplary embodiment.

An exemplary active mode will now be described according to an exemplary embodiment with reference to FIGS. 1-4. FIG. 4 is a process flow diagram of a method for vehicle control integrating environmental conditions during an active mode according to an exemplary embodiment. At block 402, the method includes determining a current position of the vehicle, from for example, the position determination device 110. In another embodiment, at block 404, the method could include receiving a current physiological parameter from a wearable device associated with a vehicle occupant. It is understood that blocks 402 and 404 can be processed in parallel or individually, as will be described in further detail herein. In some embodiments, the current physiological parameter correlates with the current position of the vehicle.

For example, the integration module 116 of the processor 104 can receive a current physiological parameter from the one or more wearable computing devices 128. Referring to FIG. 2, the VCD 102, including the processor 104, can receive a current physiological parameter from one or more wearable computing devices, each associated with a different vehicle occupant. As an illustrative example, the VCD 102 can receive a heart rate from the first wearable computing device 202 associated with the driver and a heart rate from the second wearable computing device 204 associated with a first vehicle occupant. Further, in one embodiment, the VCD 102 and/or the integration module 116 can distinguish and/or associate the current physiological parameter with the associated vehicle occupant by receiving a wearable device ID and/or a user ID associated with the wearable device. Thus, in some embodiments, the integration module 116 can receive the current physiological parameter and a wearable device ID from the one or more wearable computing devices 128.

As discussed above, at block 402, the method includes determining a current position of the vehicle from a position determination device. In some embodiments, the current physiological parameter correlates with the current position of the vehicle. The integration module 116 can receive a current position of the vehicle from the position determination device 110. The current position of the vehicle can take various forms, for example, latitudinal or longitudinal coordinates. In some embodiments, the position of the vehicle correlates with the onset and/or duration of the current physiological parameter. As an illustrative example, the position of the vehicle is the position of the vehicle where the vehicle occupant experiences a high heart rate. As mentioned above, in some embodiments, the current physiological parameter and the position of the vehicle are received in parallel. In other embodiments, the position of the vehicle is received upon receipt of the current physiological parameter. In other embodiments, the position of the vehicle is determined after receiving the physiological parameter by acquiring data stored at the position determination device 110.

It is appreciated, that in some embodiments, the method includes receiving and/or determining other parameters, for example, vehicle parameters and/or environmental parameters. For example, in one embodiment, the method includes determining a future position of the vehicle from a position determination device. A future position could be a point of interest or a destination received from the position determination device 110. In other embodiments, the method includes receiving at least one of a current vehicle parameter from the one or more vehicle systems and a current environmental parameter from the one or more vehicle systems. In this embodiment, the current vehicle parameter could be a further destination from the one or more vehicle systems 112 (e.g., a navigation system). The current vehicle parameter could also include a make and/or model of the vehicle. It is appreciated that the current vehicle parameter and/or the environmental parameter can be received from the one or more vehicle systems 122, or another device, for example, a portable device (not shown), the one or more wearable devices 128 or another external sourced (e.g., accessed by the network 126).

Further, as discussed above, the current vehicle parameter and/or the current environmental parameter can be received upon receipt of the current physiological parameter and/or the current position of the vehicle. In other embodiments, the current vehicle parameter and/or the current environmental parameter received in parallel with the current physiological parameter and/or the current position of the vehicle. Similar to the position of the vehicle discussed above, the current vehicle parameter and/or the current environmental parameter correlate with the current physiological parameter and/or the current position of the vehicle. Accordingly, the current vehicle parameter and/or the current environmental parameter correlates with the onset and duration of the current physiological parameter and/or the current position of the vehicle.

Referring again to FIG. 4, at block 406, the method includes determining a physiological overload level. As discussed above with FIG. 3, the physiological overload level can generally indicate a state, health and/or a behavior of the vehicle occupant. The level can be a numerical value, a discrete state, a discrete value and/or a continuous value. The physiological overload level can be based upon one or more of current physiological parameters, current vehicle parameters, current environmental parameters and/or current position of the vehicle.

In one embodiment, the physiological overload level is determined based on the current position of the vehicle from block 402. In this embodiment, determining the physiological overload level is accomplished by querying a geodatabase with the current position of the vehicle at block 408. The physiological overload module 118 can generate and execute a query at the geodatabase 130, wherein the query includes the current position of the vehicle. After executing the query, the geodatabase 130 returns data (e.g., records, rows) that match at least one field of the query or all fields of the query. The physiological overload module 118 analyzes the returned data to determine the physiological overload level.

As an illustrative example, the geodatabase 130 could return all records that match the current position of the vehicle. The physiological overload module 118 analyzes the physiological overload level values returned from the query to determine a physiological overload level that correlates with the current position of the vehicle. For example, the physiological overload module 118 may aggregate, average or process the physiological overload level values returned from the query to determine the physiological overload level. If the analysis indicates a high physiological overload level associated with the current position of the vehicle, control of the one or more vehicle systems (e.g., as discussed at block 410) can be based on the physiological overload level. For example, the navigation system can be controlled to re-route the vehicle to a different location.

In another embodiment, the physiological overload level is based, at least in part, on the current physiological parameter from block 404 and the position of the vehicle from block 402. In one embodiment, determining the physiological overload level is accomplished by querying a geodatabase with the current physiological parameter and the current position of the vehicle at block 408. As discussed above, the geodatabase includes at least one of physiological parameters, vehicle parameters, and environmental parameters of a group of subjects and the geodatabase can be generated during a collection mode (See FIGS. 3 and 5).

In one embodiment, the physiological overload module 118 can generate and execute a query at the geodatabase 130, wherein the query includes at least the current physiological parameter and the current position of the vehicle. In some embodiments, the physiological overload level can also be based on other parameters, for example, the current vehicle parameter and/or the current environmental parameter. Thus, in one embodiment, the method includes querying the geodatabase with at least one of the current physiological parameter, the current position of the vehicle and the future position of the vehicle to determine a physiological overload level.

After executing the query, the geodatabase 130 returns data (e.g., records, rows) that match at least one field of the query or all fields of the query. The physiological overload module 118 analyzes the returned data to determine the physiological overload level. As an illustrative example, the geodatabase 130 could return all records that match the current position of the vehicle and the current physiological parameter. For example, the current position can be (41N, −81) and the current physiological parameter can be a heart rate value. The physiological overload module 118 can then analyze the heart rate value, for example, 115 bmp, against the heart rate values returned from the geodatabase 130 to determine if the heart rate value indicates a physiological overload trigger. Based on this data, and in some embodiments, other parameters, a physiological overload level is determined for the vehicle occupant.

In another embodiment, determining a physiological overload level at block 406, includes detecting a physiological overload trigger at block 412. Similar to block 304 of FIG. 3, detecting a physiological overload trigger can be based on the current physiological parameter from block

404. In one embodiment, a physiological overload trigger is detected by comparing the current physiological parameter to a predetermined threshold. The predetermined threshold could be based on normative data for the particular vehicle occupant, average data associated with the physiological parameter, among others.

If a physiological overload trigger is detected, at block 414, the method includes determining a physiological overload trigger type. The physiological overload trigger type is at least one of a cognitive overload trigger, a physical overload trigger, and a visual overload trigger. The physiological overload type is based, at least in part, on the physiological parameter. It is appreciated that more than one physiological parameter can be used to detect a physiological overload trigger and determine a physiological overload trigger type. Further, in some embodiments, other parameters (e.g., vehicle, environmental) can be used to detect a physiological overload trigger and determine a physiological overload trigger type.

Returning to block 406, the physiological overload trigger and/or the physiological overload trigger type can also be used to determine a physiological overload level. In particular, the query generated by the physiological overload model 118 can include the physiological overload trigger and/or the physiological overload trigger type as well as other parameters (e.g., current physiological parameter, current position of the vehicle). As discussed above, the physiological overload module 118 can generate and execute a query at the geodatabase 130.

In some embodiments, the records returned from the geodatabase 130 can be data associated with the specific vehicle occupant, for example, based on the wearable device ID. In other embodiments, the records returned from the geodatabase 130 include data from a group of different individuals. After executing the query, the geodatabase 130 returns data (e.g., records, rows) that match at least one field of the query or all fields of the query. The physiological overload module 118 analyzes the returned data to determine the physiological overload level.

To determine the physiological overload level, the data returned from the geodatabase 130 can be averaged or aggregated. For example, in one embodiment, determining a physiological overload level includes aggregating data and/or specific parameters returned from the query executed at the geodatabase 130. For example, this can include at least one of the physiological parameters, vehicle parameters, and environmental parameters and determining the physiological overload level based on the aggregated data.

In some embodiments, the query executed at the geodatabase 130 can be specific to a group of subjects. For example, the query could include a wearable device ID and/or a user ID associated with one or more wearable devices 128 in the vehicle. Accordingly, records returned from the query would only include data associated with the wearable device ID and/or the user ID. In other embodiments, the query could include a vehicle make and/or model (e.g., as a current vehicle parameter). Accordingly, records returned from the query would only include data associated with users in a vehicle or the same make and/or model. In other embodiments, the records returned from the query can include data associate with any user in a specific location (e.g., the current position of the vehicle or an area around the current position of the vehicle). Thus, the data for determining the physiological overload level can be based on aggregated data of the group of subjects as defined by the query.

The physiological overload data level is used, at least in part, to control one or more vehicle systems. Accordingly, referring again to FIG. 4, at block 410, the method includes controlling one or more vehicle systems of the vehicle based on the physiological overload level. Controlling the one or more vehicle systems can also be based on other parameters, for example, at least one of the current vehicle parameter and the current environmental parameter. As an illustrative example, an operating parameter of one or more vehicle systems can be controlled and/or modified based on the physiological overload level. For example, if the physiological overload level indicates a high physical overload and a current vehicle parameter indicates the internal temperature of the vehicle cabin is too warm (i.e., above a predetermined threshold), the processor 104 can control the HVAC system to turn on the air condition and/or actuate the windows to lower the internal temperature of the vehicle. Accordingly, in some embodiments, controlling one or more vehicle systems of a vehicle based on the physiological overload level thereby changes a state of the vehicle occupant.

As mentioned above, in one embodiment, the physiological overload level is determined based on the current physiological parameter, the current position of the vehicle and the future position of the vehicle. Thus, controlling the one or more vehicle systems can be based on the physiological overload level and the future destination. This ensures that one or more vehicle systems are control so that the vehicle occupant is in a comfortable state as they approach a future destination, for example, a future destination where the vehicle occupant has previously been in a stressed state or a future destination where a group of individuals are in a stressed state. Accordingly, in one embodiment, controlling the one or more vehicle systems is executed prior to or upon the vehicle reaching the future position of the vehicle. Thus, the systems and methods described herein can infer an upcoming physiological overload trigger based on the position of the vehicle, a future destination, and in some embodiments, the current physiological parameter. Illustrative examples of controlling one or more vehicle systems will be described in future detail below.

It is appreciated that the systems and methods discussed herein can apply to more than one vehicle occupant. Accordingly, for example, in FIG. 4, at step 402, the method can include receiving a current physiological parameter for more than one vehicle occupant. The current physiological parameter for each vehicle occupant can be distinguished by the wearable device ID and/or user ID received with the current physiological parameter. Accordingly, vehicle control integrating environmental conditions can be customized for each vehicle occupant.

III. DECISION MODE

A method for vehicle control integrating environmental conditions integrating a collection mode, an active mode and decision mode according to an exemplary embodiment will now be discussed with reference to FIG. 6. In this embodiment, the collection mode and the action mode are integrated and include a decision mode for vehicle control. It is understood, that functions described herein with FIG. 6 can include the same functionality as those functions described with FIGS. 1-4.

Figure 6:
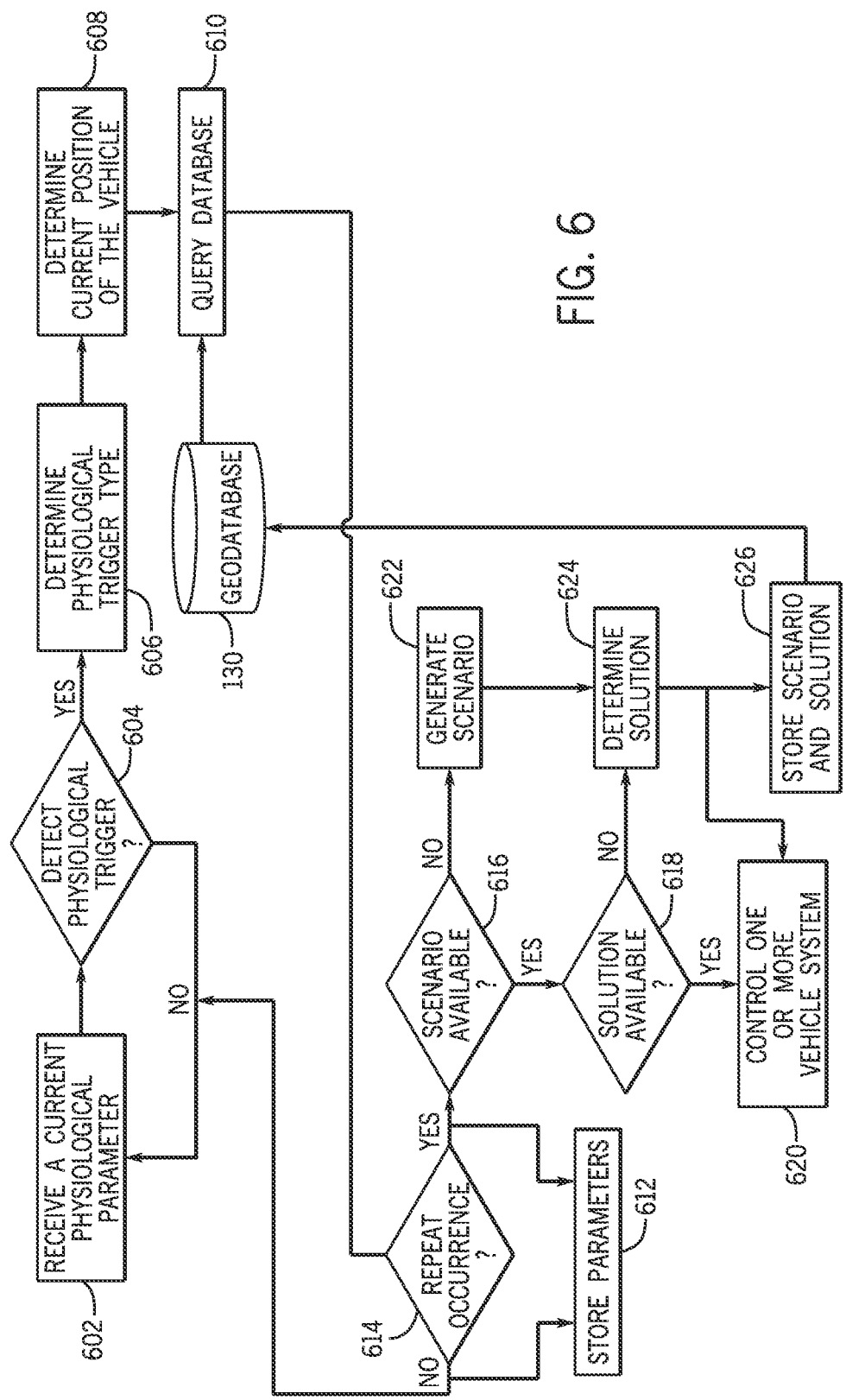
FIG. 6 is a process flow diagram of a method for vehicle control integrating environmental conditions integrating a collection mode, an active mode and decision mode according to an exemplary embodiment.

In the embodiment of FIG. 6, at block 602, the method includes receiving a current physiological parameter. Similar to block 302 of FIG. 3 discussed above, the integration module 116 and/or the collection module 120 of the processor 104 can receive a current physiological parameter from the one or more wearable computing devices 128. At block 604, the method includes detecting a physiological overload trigger. Similar to block 304 of FIG. 3, a physiological overload trigger can be detected by comparing the current physiological parameter to a predetermined threshold. The predetermined threshold could be based on normative data for the particular vehicle occupant, average data associated with the current physiological parameter, among others. In another embodiment, the current physiological parameter can be analyzed by the collection module 120 to determine if the current physiological parameter is normal as compared to normative data for an average person or the vehicle occupant associated with the one or more wearable computing devices in which the current physiological parameter originated.

If a physiological trigger is detected, at block 606, the method includes determining a physiological overload trigger type. Similar to block 306 of FIG. 3, the physiological overload trigger type is at least one of a cognitive overload trigger, a physical overload trigger, and a visual overload trigger. The physiological overload type is based, at least in part, on the current physiological parameter. At block 608, the method includes determining a current position of the vehicle. As discussed above with FIGS. 3 and 4, the current position of the vehicle can be received by the collection module 120 from a position determination device (e.g., the position determination device 110 of FIG. 1). The position of the vehicle can be in different forms, for example, latitudinal and longitudinal coordinates. The position of the vehicle correlates to the physiological parameter and/or the physiological overload trigger. Said differently, the position of the vehicle correlates with the onset and duration of the physiological parameter and/or the physiological overload trigger.

At block 610, the method includes querying the geodatabase 130 with at least one of the current physiological parameter, the physiological trigger type, and the current position of the vehicle. After executing the query, the geodatabase 130 returns data (e.g., records, rows) that match at least one field of the query or all fields of the query. The physiological overload module 118 analyzes the returned data to determine a repeat occurrence at block 614. Said differently, it is determined if the vehicle occupants and/or another group of subjects have experienced the physiological trigger in an area of the current position of the vehicle. If it is determined at block 614 that a repeat occurrence has not occurred, the parameters can be stored at block 612 in the geodatabase 130, and the process proceeds to block 602. It is appreciated that at block 612, the current physiological parameter and the current position of the vehicle are stored in the geodatabase 130. In one embodiment, the collection module 120 transmits the current physiological parameter and the current position of the vehicle to the geodatabase 130 to be stored. In a further embodiment, at block 612 the method also includes storing other parameters, for example, the physiological overload trigger type, the physiological overload level, vehicle parameters, environmental parameters, among others.

Returning to block 614, if it is determined that a repeat occurrence has occurred, the method proceeds to block 616 to determine if a scenario is available. Additionally, as discussed above, the current physiological parameter and the current position of the vehicle are stored in the geodatabase 130 at block 612. Referring back to block 616, a scenario can include one or more parameters received, for example, a physiological parameter, a vehicle parameter and/or an environmental parameter. As an illustrative example, a scenario can include a heart rate of 110 bpm (i.e., a physiological parameter), an indication of heavy traffic (i.e., an environmental parameter) and a current speed limit (i.e., an environmental parameter).

To determine if a scenario is available, the geodatabase 130 can be queried with the parameters describing the scenario. If a match in the geodatabase 130 is found at block 616, it is then determined at block 618 if a solution is available. If it is determined a scenario is not available, at block 622, a scenario is generated. A scenario can include one or more parameters received, for example, a physiological parameter, a vehicle parameter and/or an environmental parameter. The method continues at block 624, discussed below, and at block 626, the scenario generated at block 622 can be stored in the geodatabase 130.

As mentioned above, if a scenario is available as determined at block 616, it is determined if a solution is available at block 618. A solution can include one or more controls to one or more vehicle systems to mitigate the scenario. Said differently, the solution can decrease the physiological overload level and/or eliminate the physiological trigger. For example, referring to the scenario described above, a possible solution can include controlling the navigation system to direct the vehicle to an alternate route with light traffic. A solution can be stored in the geodatabase 130 in a field of a result returned by the query of the scenario. In another embodiment, the method can search for a solution in a policy set or a lookup table, for example, stored in the memory 106 or the network 126. Accordingly, if a solution is available, one or more vehicle systems are controlled based on the solution at block 620.

If a solution is not available as determined at block 618, at block 624, the method includes determining a solution. The solution can be determined by identifying parameters of the one or more vehicle systems that can be modified to mitigate the scenario (e.g., decrease the physiological overload level and/or eliminate the physiological trigger). The parameters of the one or more vehicle systems can be identified by correlating the current physiological parameter, the current vehicle parameters, the current environmental parameters with the one or more vehicle systems. In other embodiments, a solution may be determined using data from the network 126, for example, by querying a remote database with the parameters of the scenario. At block 620, the solution is implemented by controlling one or more vehicle systems according to the solution determined at block 624. Additionally, the solution can be stored in the geodatabase at block 626. Accordingly, the embodiment illustrated in FIG. 6 allows for an integration of collection and detection of environmental conditions and an effective response to said conditions by controlling one or more vehicle systems.

IV. ILLUSTRATIVE EXAMPLES

Illustrative examples will now be described with reference to FIGS. 1, 2, 4, 5 and 6. It is understood that these illustrative examples are exemplary in nature and that other combinations of vehicle occupants, parameters, and vehicle control can be implemented. As discussed above with FIG. 4, at block 404, the integration module 116 can receive a current physiological parameter from a wearable device associate with a vehicle occupant, for example, the first wearable computing device 202 associated with a driver. In this example, the integration module 116 receives a body temperature (e.g., 98 degrees) and a heart rate value (e.g., 72 bpm) received from the first wearable computing device 202. At block 402, the integration module 116 determines a current position of the vehicle (e.g., (25N, −81W)) from a position determination device 110. At block 406, the physiological overload module 118 determines a physiological overload level of the driver. In one embodiment, the physiological overload module 118 queries at block 408 the geodatabase 130 with at least the current physiological parameter (e.g., the body temperature and the heart rate value) and the current position of the vehicle ((e.g., (25N, −81W)). In some embodiments, the wearable device ID/user ID (e.g., 202) transmitted with the current physiological parameter can also be used in the query. The geodatabase 130 returns relevant records from the query.

Referring to FIG. 5, the geodatabase 130 can return record 3, which matches the wearable device ID/user ID and the current vehicle position. The physiological overload module 118 analyzes this data to determine a physiological overload level. For example, the body temperature returned from the geodatabase 130 can be 100 degrees and the heart rate value returned from the geodatabase 130 can be 110 bpm. The physiological overload module 118 compares these values to the current physiological parameters, specifically, the body temperature (e.g., 98 degrees) and the heart rate value (e.g., 72) and determines that the physiological overload level is low. The physiological overload module 118 may also receive a current vehicle parameter (e.g., HVAC off) and a current environmental parameter (e.g., external temperature of 99 degrees). Based on the physiological overload level, the current vehicle parameter and the current environmental parameter, at block 410 the process may control the HVAC to turn on at a moderate temperature to maintain the current physiological overload level, thereby maintain a comfortable state for the driver.

As discussed above, in some embodiments, controlling the one or more vehicle systems can be based on a physiological overload level and a future destination. Referring again to FIG. 4, in this illustrative example, at block 404, the integration module 116 receives a heart rate value (e.g., 72 bpm) and a muscular strain value (e.g., a high strain value) received from the first wearable computing device 202. At block 402, the integration module 116 determines a current position of the vehicle (e.g., (55N, −120W)) from a position determination device 110. The integration module 116 can also determine a future position of the vehicle (e.g., (55N, −120W)). At block 406, the physiological overload module 118 determines a physiological overload level of the driver. In one embodiment, the physiological overload module 118 queries at block 408 the geodatabase 130 with at least the current physiological parameter (e.g., the heart rate value and muscle strain), the current position of the (e.g., (55N, −120W)) and the future position of the vehicle (e.g., (55N, −120W)). The geodatabase 130 returns relevant records from the query.

Referring to FIG. 5, the geodatabase 130 can return record 2, which matches the wearable device ID/user ID and the future vehicle position. The physiological overload module 118 analyzes this data to determine a physiological overload level. For example, the heart rate value returned from the geodatabase 130 can be 75 bpm and the muscle strain returned from the geodatabase 130 can be a high value. The physiological overload module 118 compares these values to the current physiological parameters, specifically; the heart rate value (e.g., 72 bpm) and the muscle train value (e.g., high strain value) and determines that the physiological overload level is moderate.

The physiological overload module 118 may also receive a current vehicle parameter (e.g., interior vehicle lighting ON; audio ON) and a current environmental parameter (e.g., rainy weather conditions). Based on the physiological overload level, the current vehicle parameter and the current environmental parameter, at block 410 the processor 104 may control one or more vehicle systems prior to or upon the vehicle reaching the future position of the vehicle. For example, the processor 104 may changing the interior vehicle lighting and the type of audio playing in the vehicle to calm the driver in anticipation of reaching a future destination where the driver may be in a stressed state.

In another illustrative example, vehicle control can be executed for multiple vehicle occupants. For example, at block 404, the integration module 116 can receive a current physiological parameter from a wearable device associate with a vehicle occupant, for example, the first wearable computing device 202 associated with a driver. In this example, the integration module 116 receives a body temperature (e.g., 98 degrees) and a heart rate value (e.g., 72) received from the first wearable computing device 202. Additionally, at block 404, the integration module 116 can receive a current physiological parameter from a wearable device associate with a vehicle occupant, for example, the third wearable computing device 206 associated with a third vehicle occupant. In this example, the integration module 116 receives a body temperature (e.g., 100 degrees) and a heart rate value (e.g., 90 bpm) received from the first wearable computing device 206.

At block 402, the integration module 116 determines a current position of the vehicle (e.g., (25N, −81W)) from a position determination device 110. At block 406, the physiological overload module 118 determines a physiological overload level of the driver and the third vehicle occupant. In this embodiment, the physiological overload module 118 queries at block 408 the geodatabase 130 with at least the current physiological parameter of the driver, the current physiological parameter of the third vehicle occupant, and the current position of the vehicle ((e.g., (25N, −81W)). In some embodiments, the wearable device ID/user ID (e.g., 202, 206) is transmitted with the current physiological parameter can also be used in the query. The geodatabase 130 returns relevant records from the query.

Referring to FIG. 5, the geodatabase 130 can return records 3 and 6, which matches the wearable device ID/user ID (e.g., 202, 206) and the current vehicle position. The physiological overload module 118 analyzes this data to determine a physiological overload level for the driver and the third vehicle occupant. For example, the physiological overload module 118 can determine that the driver has a low physiological overload level, while the third vehicle occupant has a high physiological overload level. The physiological overload module 118 may also receive a current vehicle parameter (e.g., HVAC off) and a current environmental parameter (e.g., external temperature of 99 degrees). Based on the physiological overload levels, the current vehicle parameter and the current environmental parameter, at block 410 the process may control the HVAC to turn on in the area of the third vehicle occupant only, thereby maintaining a comfortable state for the driver while changing a state of the third vehicle occupant.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for vehicle control integrating environmental conditions, comprising:
    receiving a current physiological parameter from a wearable device associated with a vehicle occupant in a vehicle;
    detecting a physiological overload trigger by comparing the current physiological parameter to a predetermined threshold, wherein the physiological overload trigger is detected when the current physiological parameter exceeds the predetermined threshold;
    determining a physiological overload trigger type of the physiological overload trigger based on the current physiological parameter, wherein the physiological overload trigger type is at least one of a cognitive overload trigger type, a physical overload trigger type, and a visual overload trigger type;
    determining a current position of the vehicle from a position determination device, wherein the current position of the vehicle correlates with the onset of the physiological overload trigger;
    querying a geodatabase for data associated with the current physiological parameter, the physiological overload trigger type, and the current position of the vehicle, wherein the data includes physiological parameters, vehicle parameters, and environmental parameters about a group of subjects;
    determining a physiological overload level based on the data by aggregating the physiological parameters, the vehicle parameters, and the environmental parameters returned in response to querying the geodatabase;
    selecting, based on the physiological overload level, one or more vehicle systems of the vehicle for controlling; and
    controlling the selected one or more vehicle systems of the vehicle based on the physiological overload level to decrease the physiological overload level or to eliminate the physiological overload trigger.

2. The method of claim 1, further including receiving at least one of a current vehicle parameter from the one or more vehicle systems and a current environmental parameter from the one or more vehicle systems.

3. The method of claim 2, wherein the current vehicle parameter is a future destination from the one or more vehicle systems.

4. The method of claim 3, wherein the selected one or more vehicle systems are controlled based on the physiological overload level and the future destination.

5. The method of claim 1, wherein querying the geodatabase for data further includes querying the geodatabase for data associated with at least one of a vehicle make and a vehicle model of the vehicle.

6. The method of claim 1, wherein the geodatabase is generated during a collection mode, the collection mode including,
    receiving a physiological parameter from the wearable device associated with the vehicle occupant;
    detecting a physiological overload trigger based on the physiological parameter;
    receiving a position of the vehicle from a position determination device, wherein the position of the vehicle correlates to the physiological parameter; and
    storing the physiological parameter and the position of the vehicle in the geodatabase.

7. The method of claim 1, wherein the cognitive overload trigger type indicates the current physiological parameter associated with cognition of the vehicle occupant, the physical overload trigger type indicates the current physiological parameter associated with a physical body of the vehicle occupant, and the visual overload trigger type indicates the current physiological parameter is-associated with eyes of the vehicle occupant.

8. A method for vehicle control integrating environmental conditions, comprising:
    receiving a current first physiological parameter from a first wearable device associated with a driver in a vehicle and a current second physiological parameter from a second wearable device associated with a vehicle occupant in the vehicle;
    determining a current position of the vehicle and a future position of the vehicle from a position determination device;
    querying a geodatabase with the current first physiological parameter, the current second physiological parameter, the current position of the vehicle and the future position of the vehicle;
    determining a physiological overload level of the driver and a physiological overload level of the vehicle occupant based on data received in response to querying the geodatabase by comparing the current first physiological parameter and the current second physiological parameter with a predetermined physiological level;
    selecting, based on the physiological overload level of the driver and the physiological overload level of the vehicle occupant, one or more vehicle systems of the vehicle for controlling; and
    controlling the selected one or more vehicle systems of the vehicle based on the physiological overload level of the driver and the physiological overload level of the vehicle occupant to independently change a state of the driver and a state of the vehicle occupant.

9. The method of claim 8, wherein the selected one or more vehicle systems of the vehicle are controlled prior to the vehicle reaching the future position of the vehicle.

10. The method of claim 8, further including receiving at least one of a current vehicle parameter from the one or more vehicle systems and a current environmental parameter from the one or more vehicle systems.

11. The method of claim 10, wherein querying the geodatabase further includes querying the geodatabase with the current first physiological parameter, the current second physiological parameter, the current position of the vehicle, the current vehicle parameter and the current environmental parameter.

12. The method of claim 8, wherein determining the physiological overload level of the driver and the physiological overload level of the vehicle occupant includes aggregating the data received in response to querying the geodatabase.

13. A system for vehicle control integrating environmental conditions, comprising:

a wearable device associated with a vehicle occupant for sensing one or more parameters associated with the vehicle occupant;

a vehicle computing processor communicatively coupled to the wearable device, one or more vehicle systems of a vehicle, and a geodatabase;

an integration module of the processor that receives a current physiological parameter from the wearable device and a current position of the vehicle from a position determination device, wherein the integration module of the processor detects a physiological overload trigger by comparing the current physiological parameter to a predetermined threshold, wherein the physiological overload trigger is detected when the current physiological parameter exceeds the predetermined threshold, and determines a physiological overload trigger type of the physiological overload trigger based on the current physiological parameter, wherein the physiological overload trigger type is at least one of a cognitive overload trigger type, a physical overload trigger type, and a visual overload trigger type; and a physiological overload module of the processor that queries the geodatabase for data associated with the current physiological parameter, the current position of the vehicle, and the physiological overload trigger type, wherein the physiological overload module of the processor determines a physiological overload level based on the data, wherein the processor selects, based on the physiological overload level, at least one of the one or more vehicle systems of the vehicle for controlling, and wherein the processor controls, based on the physiological overload level, the one or more vehicle systems of the vehicle that have been selected to decrease the physiological overload level or to eliminate the physiological overload trigger.

14. The system of claim 13, wherein the integration module further receives a current vehicle parameter from the one or more vehicle systems and a current environmental parameter from the one or more vehicle systems, wherein the current vehicle parameter and the current environmental parameter correlate with at least one of the current physiological parameter and the current position of the vehicle.

15. The system of claim 14, wherein the current vehicle parameter is a future destination and the one or more vehicle systems of the vehicle that have been selected are controlled by the processor based on the physiological overload level and the future destination.

16. The system of claim 13, wherein the geodatabase is generated by a collection module of the processor that receives a physiological parameter from the wearable device associated with the vehicle occupant, determines a physiological overload trigger based on the physiological parameter, receives a position of the vehicle from the position determination device related to the physiological parameter, and stores the physiological parameter and the position of the vehicle in the geodatabase.

17. The system of claim 13, wherein the processor further determines whether the one or more vehicle systems are controlled in response to the physiological overload level, and if the one or more vehicle systems are not controlled, the processor updates the geodatabase based on at least the current position.

* * * * *